US010567267B2

(12) United States Patent
Thubert et al.

(10) Patent No.: US 10,567,267 B2
(45) Date of Patent: Feb. 18, 2020

(54) DETERMINISTIC DATA COLLECTION FROM MOBILE NETWORK DEVICE TRAVELING WITHIN A DETERMINISTIC NETWORK

(71) Applicant: Cisco Technology, Inc., San Jose, CA (US)

(72) Inventors: Pascal Thubert, La Colle sur Loup (FR); Patrick Wetterwald, Mouans Sartoux (FR); Eric Michel Levy-Abegnoli, Valbonne (FR); Jean-Philippe Vasseur, Saint Martin d'Uriage (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/642,657

(22) Filed: Jul. 6, 2017

(65) Prior Publication Data

US 2019/0014030 A1  Jan. 10, 2019

(51) Int. Cl.
*H04L 12/751* (2013.01)
*H04W 24/02* (2009.01)

(52) U.S. Cl.
CPC ............. *H04L 45/02* (2013.01); *H04W 24/02* (2013.01)

(58) Field of Classification Search
CPC ...... H04L 45/02; H04W 24/02; H04W 84/18; H04W 40/02
See application file for complete search history.

(56) References Cited

U.S. PATENT DOCUMENTS

| 7,366,111 | B2 | 4/2008 | Thubert et al. |
| 7,593,377 | B2 | 9/2009 | Thubert et al. |
| 7,885,274 | B2 | 2/2011 | Thubert |
| 7,886,075 | B2 | 2/2011 | Molteni et al. |
| 8,527,457 | B2 | 9/2013 | Moon et al. |
| 2009/0122774 | A1* | 5/2009 | Seok ........................ H04L 47/72 370/338 |

(Continued)

OTHER PUBLICATIONS

Wikipedia, "Audio Video Bridging", [online] Mar. 5, 2017, [retrieved on Jun. 21, 2017]. Retrieved from the Internet: URL: <https://en.wikipedia.org/wiki/Audio_Video_Bridging>, pp. 1-11.

(Continued)

*Primary Examiner* — Thai Nguyen
(74) *Attorney, Agent, or Firm* — Leon R. Turkevich

(57) ABSTRACT

In one embodiment, a method comprises: determining access point devices providing network coverage for a mobile network device within a prescribed coverage area of a deterministic network; establishing a deterministic reception tree comprising a root and switching devices associated with the access point devices, the deterministic reception tree enabling any one or more of the switching devices to forward toward the root a data packet, transmitted by the mobile network device at a prescribed transmission time, for deterministic reception by the root at a prescribed reception time regardless of any distance of any of the access point devices from the root; and causing the switching devices to implement the deterministic reception tree enabling the root to deterministically receive the data packet, received by any one or more of the access point devices, at the prescribed reception time.

20 Claims, 8 Drawing Sheets

(56) References Cited

U.S. PATENT DOCUMENTS

| | | | |
|---|---|---|---|
| 2015/0023205 A1* | 1/2015 | Vasseur | H04L 45/02 370/254 |
| 2015/0078333 A1 | 3/2015 | Byers et al. | |
| 2015/0327261 A1 | 11/2015 | Thubert et al. | |
| 2016/0269096 A1 | 9/2016 | Thubert et al. | |
| 2016/0308793 A1 | 10/2016 | Levy-Abegnoli et al. | |

OTHER PUBLICATIONS

Wikipedia, "Steiner tree problem", [online], Mar. 9, 2017, [retrieved on Jun. 21, 2017]. Retrieved from the Internet: URL: <https://en.wikipedia.org/wiki/Steiner_tree_problem>, pp. 1-6.

Wikipedia, "Time-Sensitive Networking", [online], May 22, 2017, [retrieved on Jun. 21, 2017]. Retrieved from the Internet: URL: <https://en.wikipedia.org/wiki/Time-Sensitive_Networking>, pp. 1-7.

Thubert et al., U.S. Appl. No. 15/055,690, filed Feb. 29, 2016.

Wang et al., "6TiSCH Operation Sublayer (6top) Interface", [online], Jul. 6, 2015, [retrieved on Jan. 27, 2016]. Retrieved from the Internet: <URL: https://tools.ietf.org/pdf/draft-ietf-6tisch-6top-interface-04.pdf>, pp. 1-34.

Thubert, Ed., "An Architecture for IPv6 over the TSCH mode of IEEE 802.15.4", [online], Nov. 26, 2015, [retrieved on Jan. 27, 2016]. Retrieved from the Internet: <URL: https://tools.ietf.org/pdf/draft-ietf-6tisch-architecture-09.pdf>, pp. 1-47.

Sudhaakar et al., "6TiSCH Resource Management and Interaction using CoAP", [online], Mar. 9, 2015, [retrieved on Jan. 27, 2016]. Retrieved from the Internet: <URL: https://tools.ietf.org/pdf/draft-ietf-6tisch-coap-03.pdf>, pp. 1-16.

Vilajosana et al., "Minimal 6TiSCH Configuration", [online], Jan. 16, 2016, [retrieved on Jan. 27, 2016]. Retrieved from the Internet: <URL: https://tools.ietf.org/pdf/draft-ietf-6tisch-minimal-14.pdf>, pp. 1-28.

Palattella, et al., "Terminology in IPv6 over the TSCH mode of IEEE 802.15.4e", [online], Nov. 2, 2015, [retrieved on Jan. 27, 2016]. Retrieved from the Internet: <URL: https://tools.ietf.org/pdf/draft-ietf-6tisch-terminology-06.pdf>, pp. 1-14.

Winter, et al., "RPL: IPv6 Routing Protocol for Low-Power and Lossy Networks", Internet Engineering Task (IETF), Request for Comments: 6550, Mar. 2012, pp. 1-157.

Watteyne, et al., "Using IEEE 802.15.4e Time-Slotted Channel Hopping (TSCH) in the Internet of Things (IoT): Problem Statement", Internet Engineering Task Force (IETF), Request for Comments: 7554, May 2015, pp. 1-23.

TTTech, "Time-Triggered Ethernet—A Powerful Network Solution for Multiple Purpose", [online], [retrieved on Feb. 11, 2016]. Retrieved from the Internet: <URL: https://www.tttech.com/download/technologies/deterministic-ethernet/time-triggered-ethernet/?file=%2Ffileadmin%2Fcontent%2Fgeneral%2Fsecure%2FTTEthernet%2FTTTech_TTEthernet_Technical-Whitepaper.pdf&hash=0560afac568e8db0ee899519f1f95b4b&eID=fileDownload>, pp. 1-14.

Wikipedia, "Generalized Multi-Protocol Label Switching", [online], Aug. 18, 2014, [retrieved on Feb. 4, 2016]. Retrieved from the Internet: <URL: https://en.wikipedia.org/w/index.php?title=Generalized_Multi-Protocol_Label_Switching&printable=yes>, pp. 1-2.

Thubert et al., "IETF 6TSCH: Combining IPv6 Connectivity with Industrial Performance", 2013 Seventh International Conference on Innovative Mobile and Internet Services in Ubiquitous Computing, IEEE, Jul. 3, 2013, XP032485811, pp. 541-546.

Thubert et al., U.S. Appl. No. 15/009,872, filed Jan. 29, 2016.

Korbi et al., "Mobility Enhanced RPL for Wireless Sensor Networks", Network of the Future (NOF), 2012 Third International Conference on the, IEEE. Nov. 21, 2012, XP032332210, pp. 1-8.

Cobarzan et al., "Analysis and Performance Evaluation of RPL under Mobility", 2014 IEEE Symposium on Computers and Communications (ISCC), IEEE, Jun. 23, 2014, XP032649826, pp. 1-6.

* cited by examiner

DETERMINISTIC DATA COLLECTION FROM MOBILE NETWORK DEVICE TRAVELING WITHIN A DETERMINISTIC NETWORK

TECHNICAL FIELD

The present disclosure generally relates to deterministic data collection from a mobile network device that is traveling within a deterministic network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Engineering Task Force (IETF) is attempting to propose standards that can be applied to wireless devices for the stringent requirements of deterministic networks (e.g., minimal jitter, low latency, minimal packet loss). For example, Low power and Lossy Networks (LLNs) allow a large number (e.g., tens of thousands) of resource-constrained devices to be interconnected to form a wireless mesh network. The IETF has proposed a routing protocol ("6TiSCH") that provides IPv6 routing using time slotted channel hopping (TSCH) based on IEEE 802.15.4e, enabling LLN devices to use low-power operation and wireless channel hopping for higher reliability. Routes can be based on the routing protocol for LLNs (RPL).

In contrast, deterministic transmission in wired networks can use time sensitive networking (TSN) and/or audio/video bridging (AVB). Neither TSN nor AVB use time slots; rather, TSN uses time-based shapers that allocate time slices and guard bands to cause a data packet to be sent or received at a given intermediate node (i.e., hop) along a path at a prescribed precise time that is reserved exclusively for the given hop; AVB can use credit-based shapers that ensure bounded latency transmit/receive queues in each hop congestion, thereby ensuring a bounded latency.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
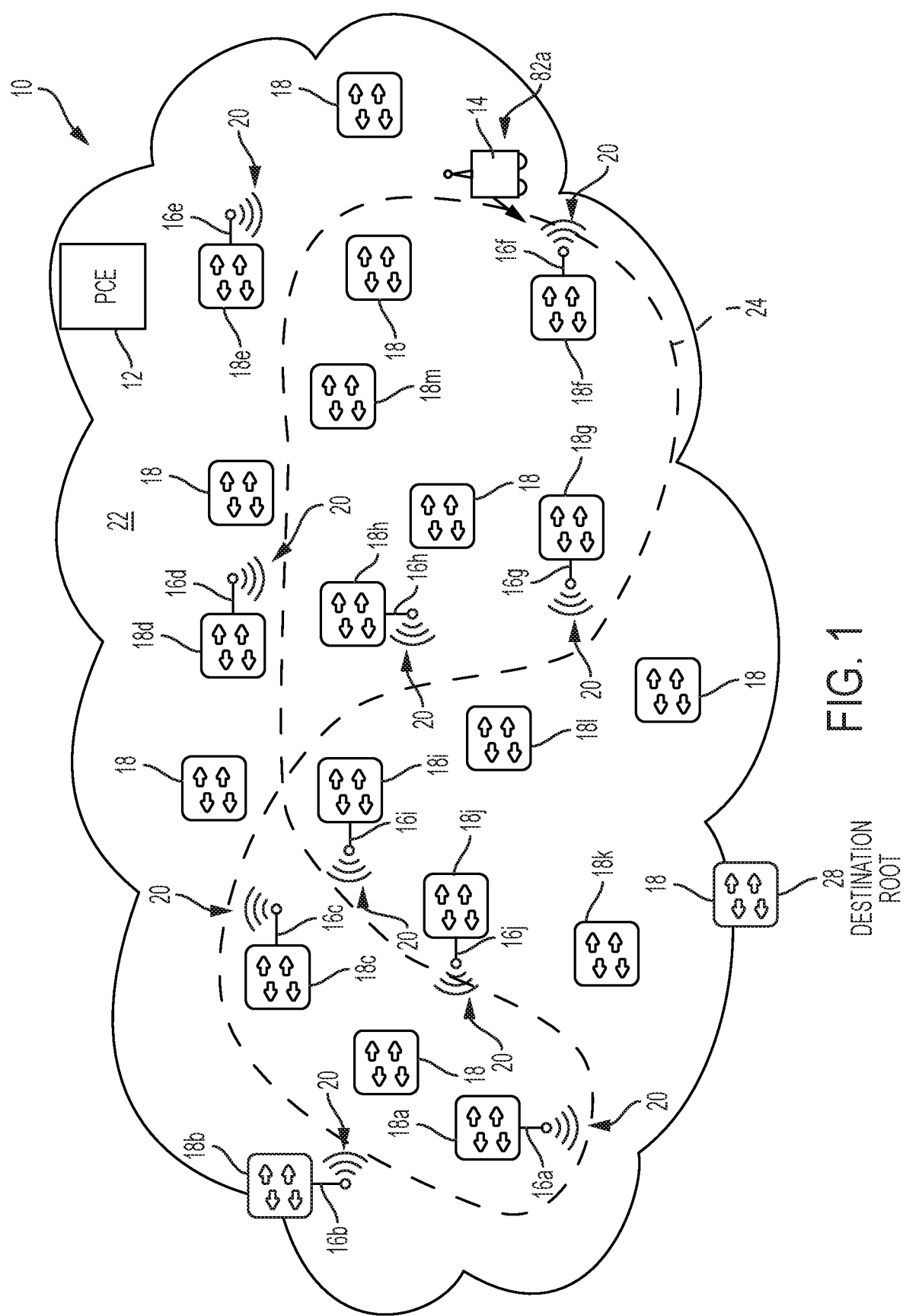
FIG. 1 illustrates an example deterministic data network having an apparatus for establishing a deterministic reception tree enabling a root to deterministically receive a data packet, transmitted by a mobile network device at a prescribed transmission time, at a prescribed reception time regardless of the position or distance of the mobile network device in the deterministic data network, according to an example embodiment.

In one embodiment, a method comprises: determining access point devices providing network coverage for a mobile network device within a prescribed coverage area of a deterministic network; establishing a deterministic reception tree comprising a root and switching devices associated with the access point devices, the deterministic reception tree enabling any one or more of the switching devices to forward toward the root a data packet, transmitted by the mobile network device at a prescribed transmission time, for deterministic reception by the root at a prescribed reception time regardless of any distance of any of the access point devices from the root; and causing the switching devices to implement the deterministic reception tree enabling the root to deterministically receive the data packet, received by any one or more of the access point devices, at the prescribed reception time.

In another embodiment, an apparatus comprises a processor circuit and a device interface circuit. The processor circuit is configured for configured for determining access point devices providing network coverage for a mobile network device within a prescribed coverage area of a deterministic network. The processor circuit further is configured for establishing a deterministic reception tree comprising a root and switching devices associated with the access point devices, the deterministic reception tree enabling any one or more of the switching devices to forward toward the root a data packet, transmitted by the mobile network device at a prescribed transmission time, for deterministic reception by the root at a prescribed reception time regardless of any distance of any of the access point devices from the root. The device interface circuit is configured for causing the switching devices to implement the deterministic reception tree enabling the root to deterministically receive the data packet, received by any one or more of the access point devices, at the prescribed reception time.

In another embodiment, one or more non-transitory tangible media are encoded with logic for execution by a machine and when executed by the machine operable for: determining access point devices providing network coverage for a mobile network device within a prescribed coverage area of a deterministic network; establishing a deterministic reception tree comprising a root and switching devices associated with the access point devices, the deterministic reception tree enabling any one or more of the switching devices to forward toward the root a data packet, transmitted by the mobile network device at a prescribed transmission time, for deterministic reception by the root at a prescribed reception time regardless of any distance of any of the access point devices from the root; and causing the switching devices to implement the deterministic reception tree enabling the root to deterministically receive the data packet, received by any one or more of the access point devices, at the prescribed reception time.

DETAILED DESCRIPTION

Particular embodiments enable a mobile network device to maintain deterministic communications with a destination network device in a deterministic data network: the particular embodiments can maintain deterministic communications between the mobile network device and the destination network device even if the mobile network device moves arbitrarily or unpredictably among different wireless access point (AP) devices providing a wireless coverage area in the deterministic network, and regardless of the distance of the access point devices relative to the destination network device. The example embodiments enable such deterministic communications without reliance on wireless time slotted protocols such as 6TiSCH that would otherwise require a repeatable deterministic track for deterministic transmissions.

Conventional implementations of a deterministic track (e.g., Generalized Multi-protocol Label Switching (G-MPLS) according to the 6TiSCH architecture) in a deterministic network assume that a central path computation element (PCE) computes and installs the deterministic track along a fixed path of next-hop nodes between a fixed source device and a fixed destination device. In other words, the deterministic track is constructed based on the assumption that the source network device is fixed and does not move; hence, if a source network device is movable (e.g., a mobile node or mobile network device) and thus detaches from a first access point device and attaches to a second (different) access point device, the PCE would need to recalculate an updated deterministic track providing for the mobile network device a deterministic path for reaching a destination device via the second access point device.

According to example embodiments, a deterministic reception tree is established for deterministic reception of a data packet transmitted by the mobile network device at a prescribed (deterministic) transmission time and received by an access network device: the root of the deterministic reception tree can deterministically receive the data packet (transmitted by the mobile network device) at a prescribed reception time regardless of the position of the mobile network device relative to the deterministic reception tree. Hence, the destination network device (i.e., the root of the deterministic reception tree) can deterministically receive the data packet transmitted at the prescribed transmission time, regardless of the position of the mobile network device within the prescribed coverage area of the deterministic network.

FIG. 1 illustrates an example deterministic data network 10 having an apparatus (e.g., a controller such as a Path Computation Element (PCE)) 12, a mobile network device (e.g., a self-driven robot vehicle, a quadcopter robotic drone device, etc.) 14, a plurality of wireless access point devices 16, and a plurality of switching devices 18. The wireless access point devices 16 can generate wireless transmission links 20 for establishment of a prescribed wireless coverage area 22 in the deterministic data network 10. The mobile network device 14 can be configured for moving in an arbitrary or unpredictable path 24, for example a two-dimensional path along a factory floor (e.g., in an X-Y coordinate space), and/or a three-dimensional path (e.g., in an X-Y-Z coordinate space); hence, the path 24 of the mobile network device 14 can have no constraints with respect to its physical movement other than remaining within the wireless coverage area 22 of the deterministic data network 10.

Since the two or three-dimensional path 24 of the mobile network device 14 has no constraints other than remaining within the wireless coverage area 22, existing deterministic networking techniques are incapable of providing a deterministic communications between a movable source network device such as the mobile network device 14, and a destination network device configured for consuming (i.e., processing) data packets initiated by the mobile network device 14, because existing techniques assume a fixed transmitting network device, and/or a prescribed repeatable path that is predetermined to permit scheduling of transmission slots along the prescribed repeatable path. Moreover, the two or three-dimensional path 24 introduces the additional problem that the wireless access point devices 16 may have different distances to a given destination; hence, use of a global receive time by all of the wireless access point devices 16 is insufficient in a deterministic data network because the different distances between the wireless access point devices 16 and a given destination could result in different delivery times of a data packet to the given destination.

Figure 4A:
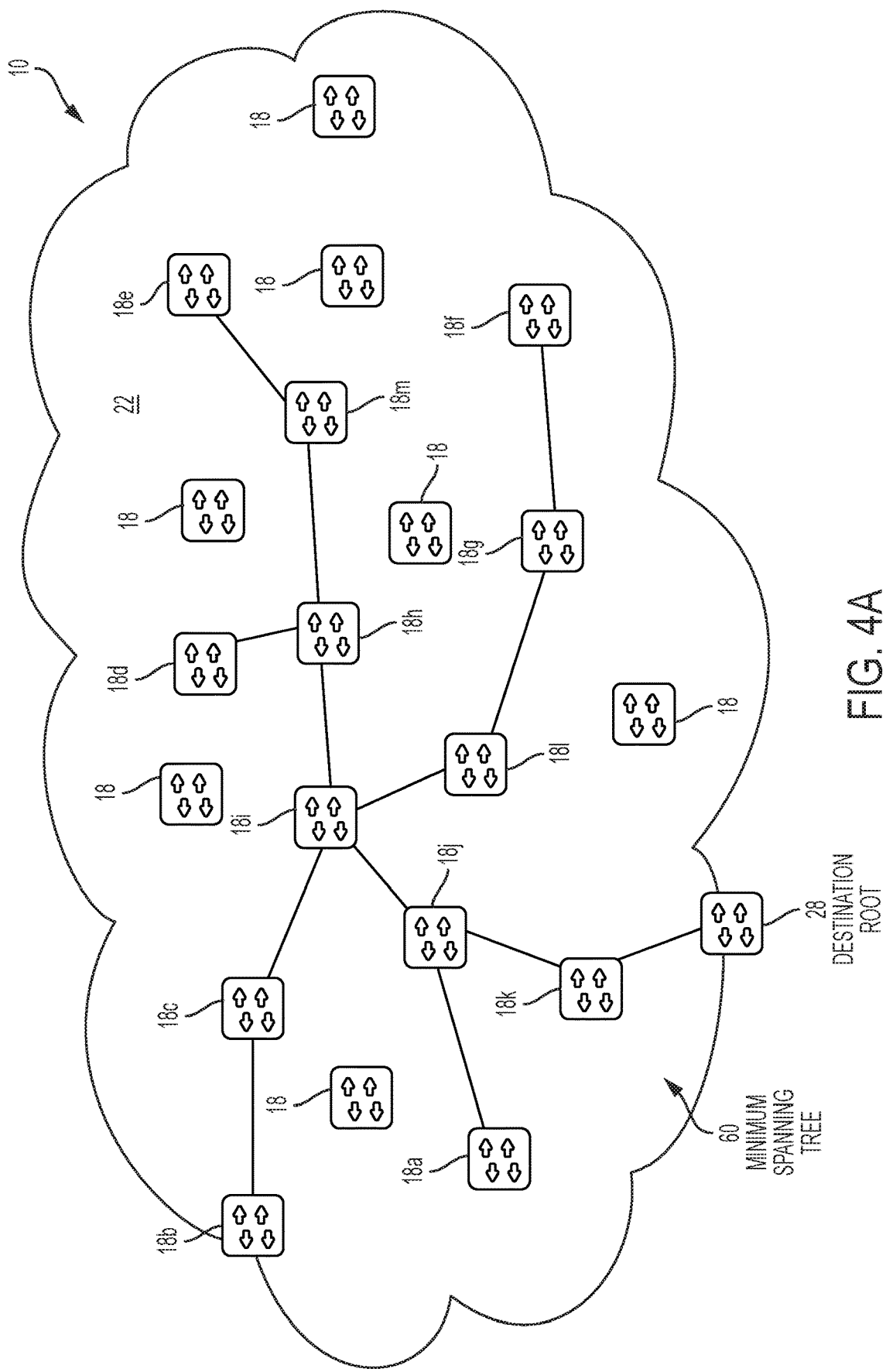
FIGS. 4A-4C illustrate in further detail the establishment of the deterministic reception tree in the deterministic data network of FIG. 1, according to an example embodiment.
Figure 4B:
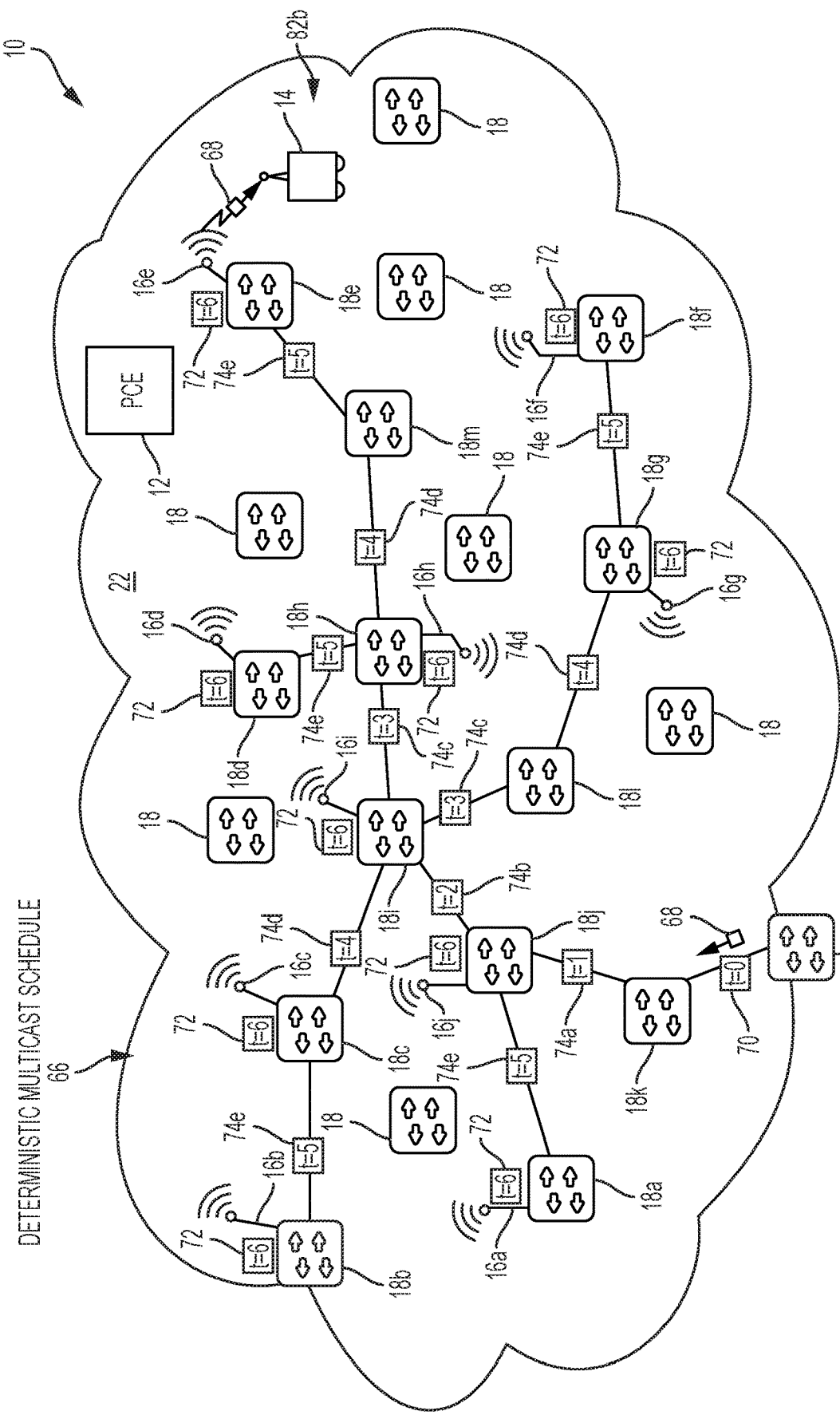
Figure 4C:
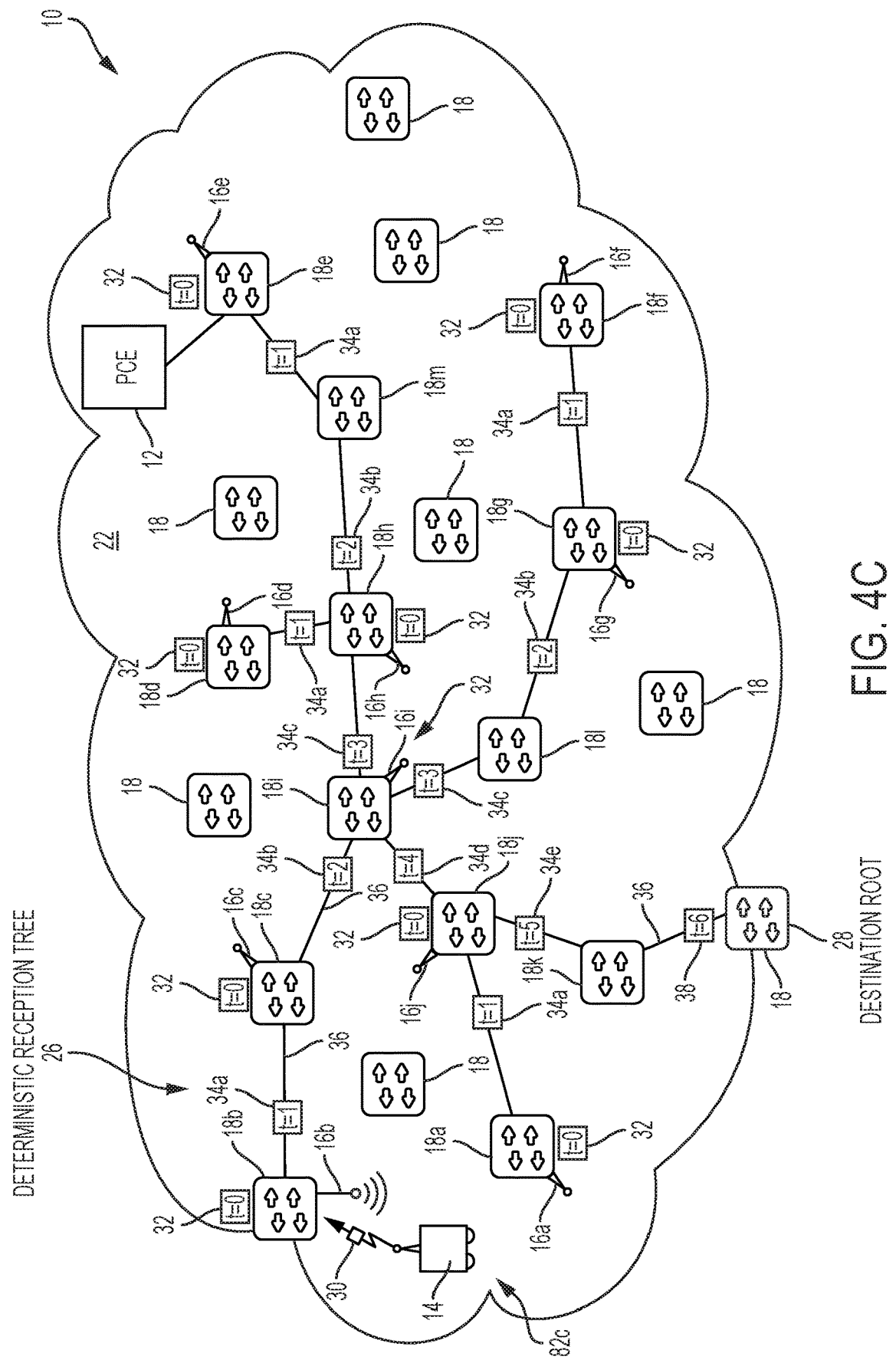

According to example embodiments, the PCE 12 is configured for establishing a deterministic reception tree 26, illustrated in FIG. 4C, enabling a root network device 28 to deterministically receive a data packet (30 of FIG. 4C, i.e., a "robot-initiated data packet") that is transmitted by the mobile network device 14 at a prescribed transmission time (e.g., "t=0" 32 of FIG. 4C), also referred to herein as a "deterministic robot transmission time": the deterministic reception tree 26 enables any wireless access point device 16 receiving the robot-initiated data packet 30 at the deterministic robot transmission time 32 to forward the received robot-initiated data packet 30 to a wired switching device 18 associated with the corresponding wireless access point device 16 at the deterministic robot transmission time "t=0" 32; as illustrated in FIG. 4C, the deterministic reception tree 26 also can cause each switching device 18 having received the robot-initiated data packet 30 to forward the received robot-initiated data packet 30 at a corresponding allocated deterministic reception forwarding time 34 via a wired data link 36 according to a deterministic reception schedule for the switching devices 18. Each switching device 18 can communicate with one or more other distinct switching devices 18 via one or more wired data links 36. The switches 18 are connected via one or more wired data links 36 (most of the wired data links 30 are not shown in the Figures to avoid cluttering).

Hence, the root network device 28 can deterministically receive the robot-initiated data packet 30, via the deterministic reception tree 26 of FIG. 4C, at a prescribed reception time "t=6" (i.e., "deterministic root reception time") 38 regardless of the position (i.e., physical location) 82 or distance of the mobile network device 14 in the deterministic data network 10. Any switching device 18 associated with a wireless access point device 16 detecting the robot-initiated data packet 30 can receive the robot-initiated data packet 30 at the deterministic robot transmission time 32, and the deterministic reception schedule established by the PCE 12 for the deterministic reception tree 26 enables the switching devices 18 in the deterministic reception tree 26 to forward the robot-initiated data packet 30 at allocated deterministic reception forwarding times 34. The deterministic reception forwarding times 34 of the deterministic reception schedule ensure guaranteed delivery of the robot-initiated data packet 30 to the root network device 28 at the deterministic root reception time 38.

Figure 2:
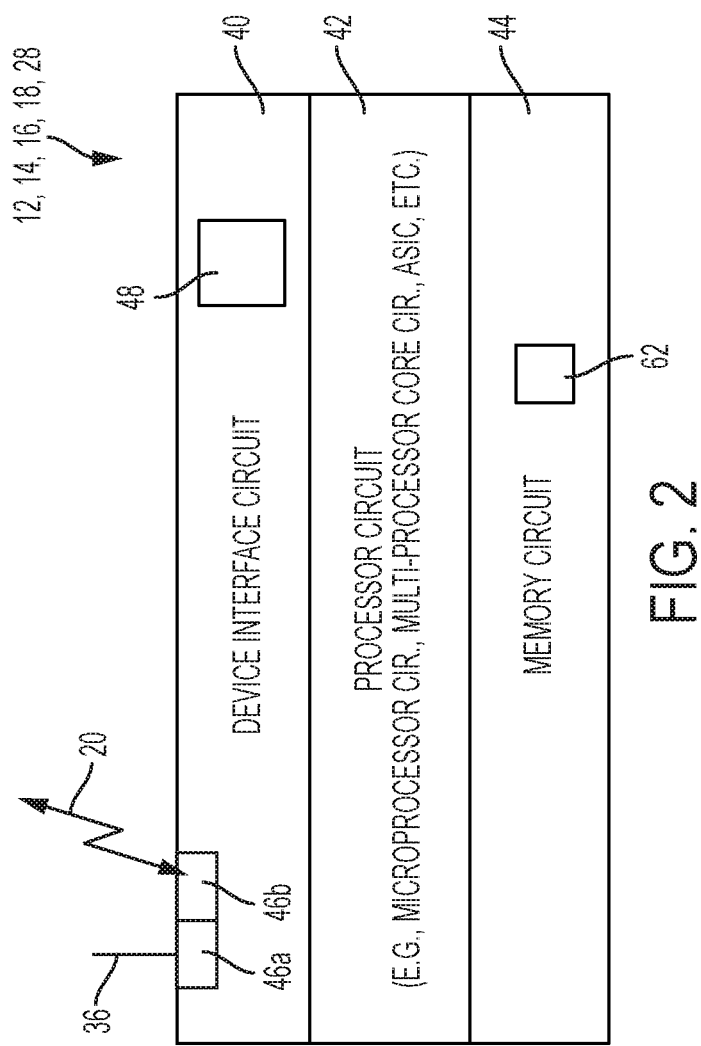
FIG. 2 illustrates an example implementation of any one of the devices of FIG. 1, including the apparatus establishing the deterministic reception tree, according to an example embodiment.

FIG. 2 illustrates an example implementation of any one of the devices 12, 14, 16, 18, and/or 28, according to an example embodiment. Each device is a physical machine (i.e., a hardware device) configured for implementing network communications with other physical machines in the deterministic data network 10 via any one of a wireless data link 20 and/or a wired data link 36. The term "configured for" or "configured to" as used herein with respect to a specified operation refers to a device and/or machine that is physically constructed and arranged to perform the specified operation.

Each apparatus 12, 14, 16, 18, and/or 28 can include a device interface circuit 40, a processor circuit 42, and a memory circuit 44.

The device interface circuit 40 can include one or more distinct physical layer transceivers for communication with any one of the other devices 12, 14, 16, 18, and/or 28; the device interface circuit 40 can include an IEEE based Ethernet transceiver (e.g., a wired transceiver 46a and/or a wireless transceiver 46b) for communications with the devices of FIG. 1 via any type of data link (e.g., a wireless link 20 or wired data link 36, an optical link, etc.). For example, the wired transceiver 46a can be implemented as IEEE 802.1 based transceiver executing TSN, for example according to IEEE P802.1Qbt and/or a transceiver configured for credit based shaping according to AVB. The wireless transceiver 46b can be implemented as a Wi-Fi based transceiver, a Bluetooth transceiver, etc. In the example of a wireless access point device 16, each wireless access point device 16 has an associated switching device 18; hence, the wireless access point device 16 can be implemented within the wireless transceiver 46b of a switching device 18, or the wireless access point device 16 can be implemented as a distinct device that can communicate with its associated switching device 18 via a corresponding wired data link 36. The device interface circuit 40 (and/or the memory circuit 44) also can include a transmit buffer 48 for storage of data packets (e.g., 30, 68), awaiting transmission on a wired data link 36 and/or a wireless data link 20.

The processor circuit 42 can be configured for executing any of the operations described herein, and the memory circuit 44 can be configured for storing any data (e.g., deterministic reception schedule parameters such as deterministic transmission, forwarding, and/or reception times, buffer credit parameters, etc.) within a data structure 62, and/or any data packets as described herein.

Although not shown in FIG. 2, any one of the devices 12, 14, 16, 18, and/or 28 (e.g., the mobile network device 14) can include other components, for example sensor devices for detecting sensor information (e.g., temperature, humidity, light intensity and/or color, images, acoustic/sound waves, air/fluid pressure, chemical detectors, etc.), actuator devices (e.g., quadcopter controls) for controlling movement of the mobile network device 14 in two or three dimensions or for movement of actuator arms, etc.

Any of the disclosed circuits of the devices 12, 14, 16, 18, and/or 28 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit (s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer 48). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Deterministic Network

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Any number of nodes, devices, links, etc. may be used in the deterministic data network 10, shown herein is for simplicity. While the deterministic data network 10 is shown in a certain orientation, the deterministic data network 10 is merely an example illustration that is not meant to limit the disclosure.

Data packets (e.g., traffic and/or messages sent between the devices/nodes) may be exchanged among the nodes/devices of the deterministic data network 10 using predefined (i.e., prescribed) network communication protocols such as certain known wired protocols (IEEE P802.1Qbt, AVB, etc.), wireless protocols (e.g., IEEE Std. 802.15.4, Wi-Fi, Bluetooth®, etc.), PLC protocols, or other shared-media protocols where appropriate. In this context, a protocol comprises a set of rules defining how the nodes interact with each other.

Deterministic networking attempts to precisely control when a data packet arrives at its destination (e.g., within a bounded timeframe). This category of networking may be used for a myriad of applications such as industrial automation, vehicle control systems, and other systems that require the precise delivery of control commands to a controlled device. However, implementing deterministic networking also places additional requirements on a network. For example, packet delivery in a deterministic network may require the network to exhibit fixed latency, zero or near-zero jitter, and high packet delivery ratios.

As an example of a deterministic network, consider a railway system. A railway system can be seen as deterministic because trains are scheduled to leave a railway station at certain times, to traverse any number stations along a track at very precise times, and to arrive at a destination station at an expected time. From the human perspective, this is also done with virtually no jitter. The tracks which are used by the different trains also may be selected so as to prevent collisions and to avoid one train from blocking the path of another train and delaying the blocked train.

Deterministic Reception Tree

FIGS. 3A-D illustrate an example method of the apparatus 12 establishing a deterministic reception tree 26 enabling a root 28 to deterministically receive a single unicast data packet 30 at a prescribed reception time 38, regardless of the position 82 or distance of the mobile network device 14 transmitting the data packet at the prescribed transmission time 32, according to an example embodiment.

FIGS. 4A-4C illustrate in further detail the establishment of the deterministic reception tree in the deterministic data network of FIG. 1, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Figure 3A:
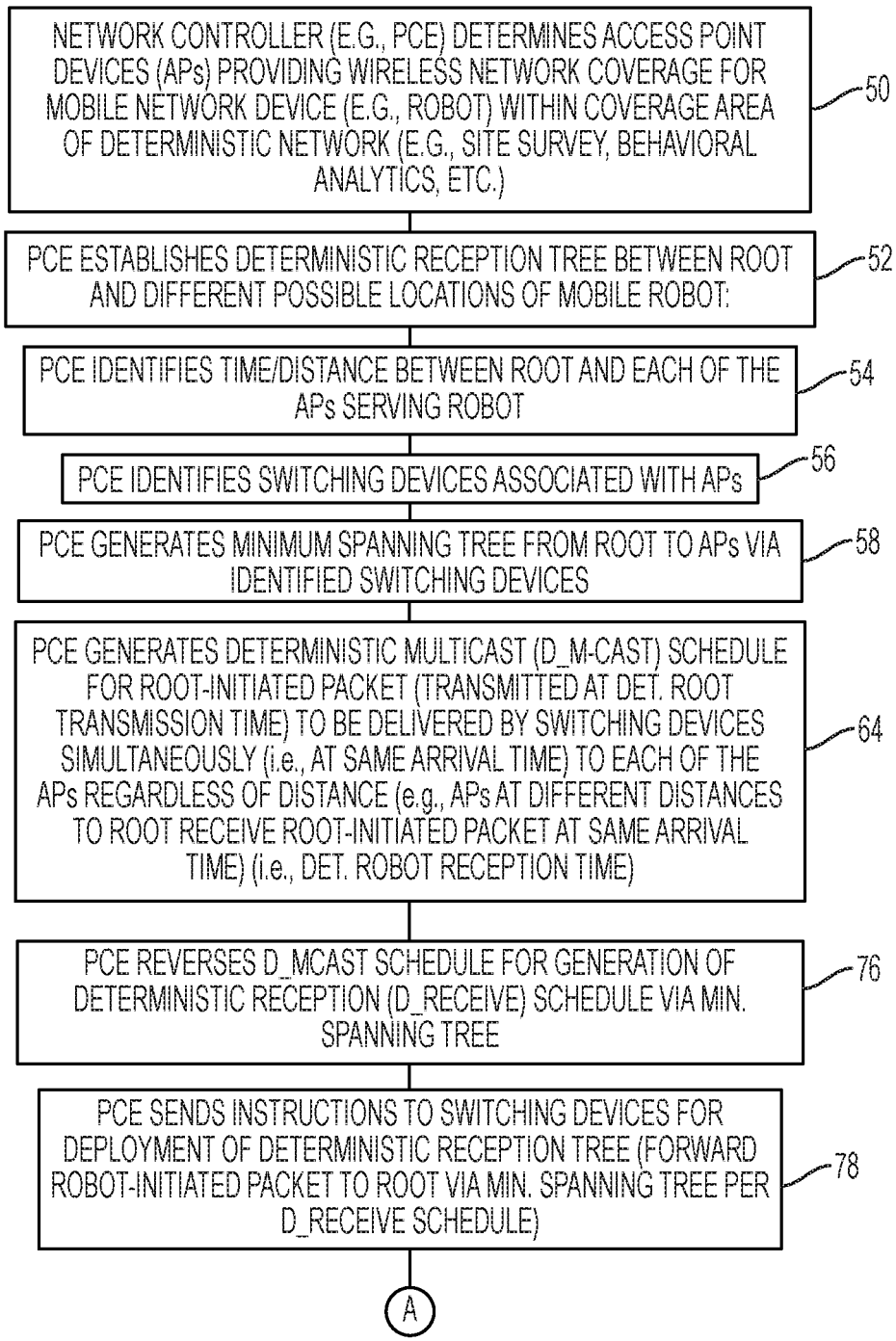
FIGS. 3A-3D illustrate an example method of the apparatus establishing a deterministic reception tree enabling a root to deterministically receive a data packet at prescribed reception time regardless of the position or distance of the mobile network device transmitting the data packet at the prescribed transmission time, according to an example embodiment.

Referring to FIG. 3A, the processor circuit 42 of the network controller (e.g., PCE) 12 in operation 50 can determine the wireless access point devices 16 that can provide wireless network coverage for a mobile network device (e.g., terrestrial robot device, quadcopter drone device, etc.) 14 that can move its position 82 under its own control within a wireless coverage area 22 of the deterministic data network 10. In particular, although the movement of the mobile network device 14 can be unpredictable at a given point in time (i.e., the precise position 82 of the mobile network device 14 at a future prescribed time cannot be determined), the processor circuit 42 of the PCE 12 in operation 50 can determine the wireless access point devices 16 (e.g., 16a through 16j) that can establish wireless communications links 20 with the mobile network device 14 as the mobile network device 14 moves along its path 24 in the wireless coverage area 22.

In particular, the mobile network device 14 can disconnect from one wireless access point device (e.g., 16f) and connect with another wireless access point device (e.g., 16g) as the mobile network device moves from its prior position (82a of FIG. 1) to another position closer to the wireless access point device 16g). The wireless access point devices 16 providing wireless network coverage for the mobile network device 14 can be determined in operation 50, for example, via two or three dimensional site survey, behavioral analytics, etc.

The processor circuit 42 of the PCE 12 in operation 52 can initiate establishment of the deterministic reception tree 26 of FIG. 4C for deterministic forwarding of an identified data flow of data packets 30 from the mobile network device 14 to a destination network device that is identified by the PCE 12 as a root network device 28 of the deterministic reception tree 26. The PCE 12 identifies in operation 52 the root network device 28 as the "sink" for the data packets 30 that are transmitted by the mobile network device 14 at a deterministic robot transmission time 32. The root network device 28 can be implemented as a switching device 18, a user device, a management entity device (e.g., a controller device in an industrial automation facility), a Supervisory Control and Data Acquisition (SCADA) system or an Intelligent Electronic Device (IED) in a Smart Grid system, a gateway for a Utility Wide Area Network, etc.

If the PCE 12 determines that a second destination network device needs to deterministically receive a second different identified flow of robot-initiated data packets 30 from the mobile network device 14, the PCE 12 can establish a second different deterministic reception tree 26 for the deterministic reception of the second identified flow of robot-initiated data packets 30 from the mobile network device 14. Hence, the PCE 12 establish multiple (non-interfering) deterministic reception trees 26 providing deterministic reachability to respective destination devices. The following example assumes a single deterministic reception tree 26 needs to be established for the root network device 28 of FIGS. 1 and 4A-4C.

Referring to FIG. 3A, the processor circuit 42 of the PCE 12 in operation 54 can initiate establishment of the deterministic reception tree 26 based on identifying the latency time and/or distance between the root network device 28 and each of the wireless access point devices 16 (e.g., 16a through 16j) serving the mobile network device 14. The processor circuit 42 of the PCE 12 in operation 56 can identify for each wireless access point device 16 a corresponding switching device 18 associated with the wireless access point device 16. As illustrated in FIG. 1, the processor circuit 42 of the PCE 12 can identify the switching devices 18a through 18j as associated with the wireless access point devices 16a through 16j: the switching device 18a is associated with the wireless access point device 16a; the switching device 18b is associated with the wireless access point device 16b; the switching device 18c is associated with the wireless access point device 16c; the switching device 18d is associated with the wireless access point device 16d; the switching device 18e is associated with the wireless access point device 16e; the switching device 18f is associated with the wireless access point device 16f; the switching device 18g is associated with the wireless access point device 16g; the switching device 18h is associated with the wireless access point device 16h; the switching device 18i is associated with the wireless access point device 16i; and the switching device 18j is associated with the wireless access point device 16j. Other wireless access point devices 16 (not shown) can be deployed in the deterministic data network 10 that are determined by the PCE 12 to not provide coverage for the mobile network device 14 (i.e., the mobile network device 14 does not move within wireless range of the other wireless access point devices 16). Any one of the switching devices 18 (18a through 18j) associated with a wireless access point device 16 also can be referred to as an "AP-associated switching device."

The processor circuit 42 of the PCE 12 in operation 58 can generate a minimum spanning tree (60 of FIG. 4A) from the root network device 28 to each of the wireless access point devices 16 via their respective identified AP-associated switching devices 18. The PCE 12 can store in operation 58 in the memory circuit 44 a data structure 62 that identifies the minimum spanning tree 60 (e.g., by the identified flow from the mobile network device 14 to the root 28) and associated attributes of the minimum spanning tree 60. As illustrated in FIG. 4A, the PCE 12 can add the AP-associated switching devices 18a, 18b, 18d, 18e, and 18f as leaf nodes of the minimum spanning tree 60, and can add the AP-associated switching devices 18c, 18g, 18h, 18i, and 18j as forwarding nodes (i.e., "parent" nodes) of the minimum spanning tree 60. The PCE 12 also can add the switching devices 18k, 18l, and 18m as "forwarding-only" switching devices that do not have any associated wireless access point device 16.

Hence, processor circuit 42 of the PCE 12 can store in the data structure 62 that the minimum spanning tree 60 comprises the AP-associated switching devices 18a through 18j and the forwarding-only switching devices 18k through 18m; the processor circuit 42 of the PCE 12 also can store in the data structure 62 the parent-child relationships between the switching devices 18a through 18m in the minimum spanning tree 60, along with the associated latency and/or distances (e.g., hop count) between each of the switching devices 18a through 18m relative to the root network device 28. The remaining switching devices 18 in FIG. 4A are unused switching devices with respect to the minimum spanning tree 60 or the deterministic reception tree 26.

The processor circuit 42 of the PCE 12 in operation 58 can store in the data structure 62 the distance and parent-child relationship of each switching device 18 relative to the root network device 28, for example specifying in the data structure 62 that: the switching device 18k (a child of the root network device 28) is one (1) hop away from the root network device 28; the switching device 18j (a child of parent the switching device 18k) is two (2) hops away from the root network device 28; the switching devices 18a and 18i (each children of the parent switching device 18j) each are three (3) hops away from the root network device 28; the switching devices 18c, 18h and 18l (each children of the parent switching device 18i) each are four (4) hops away from the root network device 28; the switching devices 18b (a child of the parent switching device 18c), 18d and 18m (each children of the parent switching device 18h) and 18g (a child of the parent switching device 18l) each are five (5) hops away from the root network device 28; and the leaf switching device 18e (a child of the parent switching device 18m) and the leaf switching device 18f (a child of the parent switching device 18g) each are six (6) hops away from the root network device 28.

Based on the topology information of the minimum spanning tree 60 stored in the data structure 62, the processor circuit 42 of the PCE 12 in operation 58 can store in the data structure 62 that: the wireless access point device 16j is two (2) hops away from the root network device 28; the wireless access point devices 16a and 16i are three (3) hops away from the root network device 28; the wireless access point devices 16c and 16h are four (4) hops away from the root network device 28; the wireless access point devices 16b, 16d, and 16g are five (5) hops away from the root network device 28, and the wireless access point devices 16e and 16f are six (6) hops away from the root network device 28. Consequently, the PCE 12 can identify that the wireless access point devices 16 are at different distances from the root network device 28, but require deterministic propagation that guarantees that the robot-initiated data packet 30 transmitted by the mobile network device 14 at the deterministic robot transmission time 32 of FIG. 4C is deterministically received by the root network device 28 at the deterministic root reception time 38, regardless of the different number of hops via the different wireless access point devices 16.

Hence, the processor circuit 42 of the PCE 12 in operation 58 generates the minimum spanning tree 60, where the attributes (member switching devices, latency and/or distances between switching devices and root) are stored in the data structure 62.

The processor circuit 42 of the PCE 12 in operation 64 can generate a deterministic multicast (D_M-Cast) schedule (66 of FIG. 4B) that enables the root network device 28 to deterministically transmit a root-originated unicast message 68, at a deterministic root transmission time "t=0" 70 on a wired data link 36, via the minimum spanning tree 60 that enables the switching devices 18a-18m in the minimum spanning tree 60 to deliver the root-originated unicast message 68 (multicast via replication in the minimum spanning tree 60) to each of the access point devices 16a-16j simultaneously at a same multicast arrival time "t=6" (i.e., "deterministic robot reception time") 72, regardless of the different distances of any of the access point devices 16 to the root network device 28. As described in further detail below, the processor circuit 42 of the PCE 12 in operation 64 can establish the deterministic multicast schedule 66 based on creating the deterministic root transmission time 70 for the root network device 28, the deterministic robot reception time 72 for each of the AP-associated switching devices 18a-18j, and respective buffering times and deterministic multicast forwarding times 74 for each of the (non-leaf) switching devices 18c, and 18g through 18m.

As illustrated in FIG. 4B, the processor circuit 42 of the PCE 12 in operation 64 can generate the deterministic multicast schedule 66 based on establishing for the switching device 18k a deterministic multicast forwarding time "t=1" 74a to the switching device 18j following reception of the root-originated message 68 at the deterministic root transmission time "t=0" 70, causing the switching device 18k to buffer in its transmit buffer 48 the root-originated message 68 in between the deterministic root transmission time "t=0" 70 and the deterministic multicast forwarding time "t=1" 74a.

The PCE 12 in operation 64 also can establish for the switching device 18j a deterministic multicast forwarding time "t=2" 74b to the switching device 18i following reception of the root-originated message 68 at the deterministic multicast forwarding time "t=1" 74a, causing the switching device 18j to buffer in its transmit buffer 48 the root-originated message 68 starting with reception at the multicast forwarding time "t=1" 74 until the deterministic robot reception time "t=6" 72 for the associated wireless access point device 16j (described below).

The PCE 12 in operation 64 also can establish for the switching device 18i a deterministic multicast forwarding time "t=3" 74c to the switching device 18h and the switching device 18l following reception of the root-originated message 68 at the deterministic multicast forwarding time "t=2" 74b, causing the switching device 18i to replicate the root-originated message 68 for deterministic reception by the switching device 18h and 18l at the deterministic multicast forwarding time "t=3" 74c, and causing the switching device 18i to buffer in its transmit buffer 48 the root-originated message 68 starting with reception at the multicast forwarding time "t=2" 74b until the deterministic robot reception time "t=6" 72 for the associated wireless access point device 16i (described below). The PCE 12 in operation 64 also can establish for the switching device 18i a deterministic multicast forwarding time "t=4" 74d to the switching device 18c, causing the switching device 18i to replicate the root-originated message 68 for deterministic reception by the switching device 18c at the deterministic multicast forwarding time "t=4" 74d.

The PCE 12 in operation 64 also can establish for the switching device 18h a deterministic multicast forwarding time "t=4" 74d to the switching device 18m, and for the switching device 18l a deterministic multicast forwarding time "t=4" 74d to the switching device 18g, enabling each of the switching devices 18g and 18m to deterministically receive a copy of the root-originated message 68 at the deterministic multicast forwarding time "t=4" 74d.

The PCE 12 in operation 64 also can establish for each of the switching devices 18c, 18g, 18h, 18j, and 18m a corresponding deterministic multicast forwarding time "t=5" 74e enabling the root-originated message 68 to be deterministically received at the deterministic multicast forwarding time "t=5" 74e by the switching devices 18b, 18f, 18d, 18a, and 18e, respectively. Hence, all the wireless access points 16a through 16j can simultaneously receive the root-originated message 68 at the same arrival time "t=6" 72, even if the wireless access points 16a through 16j have different hop-count distances to the root network device 28. As described below with respect to operation 88 of FIG. 3B, the wireless access point devices 16 can be configured such that the root-originated message 68 is transmitted at the deterministic robot reception time 72 only by the one wireless access point device 16 (e.g., 16e) in wireless communication with the mobile network device 14, whereas any wireless access point device 16 that is not in communication with the mobile network device 14 can drop the received root-originated message 68.

Hence, the PCE 12 stores in the data structure 62 the deterministic multicast schedule 66 for deterministic multicast transmission of the root-originated message 68 via the wired data links 36 in the minimum spanning tree 60: the root network device 28 can deterministically transmit the root-originated message 68 to the switching device 18k at the deterministic root transmission time 70 (t=0); the switching device 18k can deterministically forward the root-originated message 68 to the switching device 18j at the deterministic multicast forwarding time 74a (t=1); the switching device 18j can deterministically forward the root-originated message 68 to the switching device 18i at the deterministic multicast forwarding time 74b (t=2); the switching device 18i can deterministically forward the root-originated message 68 to the switching device 18h and the switching device 18l at the deterministic multicast forwarding time 74c (t=3); at the deterministic multicast forwarding time 74d (t=4) the switching device 18h can deterministically forward the root-originated message 68 to the switching device 18m, the switching device 18i can deterministically forward the root-originated message 68 to the switching device 18c, and the switching device 18l can deterministically forward the root-originated message 68 to the switching device 18g; and at the deterministic multicast forwarding time 74e (t=5) each of the switching device 18c can deterministically forward the root-originated message 68 to the switching device 18b, the switching device 18g can deterministically forward the root-originated message 68 to the switching device 18f, the switching device 18h can deterministically forward the root-originated message 68 to the switching device 18d, the switching device 18j can deterministically forward the root-originated message 68 to the switching device 18a, and the switching device 18m can deterministically forward the root-originated message 68 to the switching device 18e.

Hence, the deterministic multicast schedule 66 enables the switching devices to deliver the root-originated 68 message to each of the wireless access point devices 16 at the same arrival time 72 (t=6), regardless of the distance of the wireless access point devices 16 from the root network device 28.

Following generation of the deterministic multicast schedule 66 in operation 64, the processor circuit 42 of the PCE 12 in operation 76 reverses the deterministic multicast schedule 66 for generation of a deterministic reception schedule (D_Receive) that is used by the switching devices 18 to deploy the deterministic reception tree 26 via the minimum spanning tree 60. In other words, the PCE 12 "reverses" the deterministic multicast schedule 66 by transposing the positional relationships of each of the transmission times of the deterministic multicast schedule 66 ("t=1" through "t=6") such that the deterministic reception tree 26 is the "inverse" of the deterministic multicast schedule 66:

the deterministic root transmission time "t=0" 70 (FIG. 4B) is mapped on reversal to the deterministic root reception time "t=6" 32 (FIG. 4C); the deterministic multicast forwarding time "t=1" 74*a* (FIG. 4B) is mapped on reversal to the deterministic reception forwarding time "t=5" 34*e* (FIG. 4C); the deterministic multicast forwarding time "t=2" 74*b* (FIG. 4B) is mapped on reversal to the deterministic reception forwarding time "t=4" 34*d* (FIG. 4C); the deterministic multicast forwarding time "t=3" 74*c* (FIG. 4B) is mapped on reversal to the deterministic reception forwarding time "t=3" 34*c* (FIG. 4C); the deterministic multicast forwarding time "t=4" 74*d* (FIG. 4B) is mapped on reversal to the deterministic reception forwarding time "t=2" 34*b* (FIG. 4C); the deterministic multicast forwarding time "t=5" 74*e* (FIG. 4B) is mapped on reversal to the deterministic reception forwarding time "t=1" 34*a* (FIG. 4C); and the deterministic robot reception time "t=6" 72 (FIG. 4B) is mapped on reversal to the deterministic robot transmission time "t=0" 32 (FIG. 4C).

The processor circuit 42 of the PCE 12 in operation 76 stores the deterministic reception tree 26 in the data structure 62, and sends in operation 78 instructions that are unicast to each of the switching devices 18*a* through 18*m* and the root network device 28 for deployment of the deterministic reception tree 26.

Figure 3B:
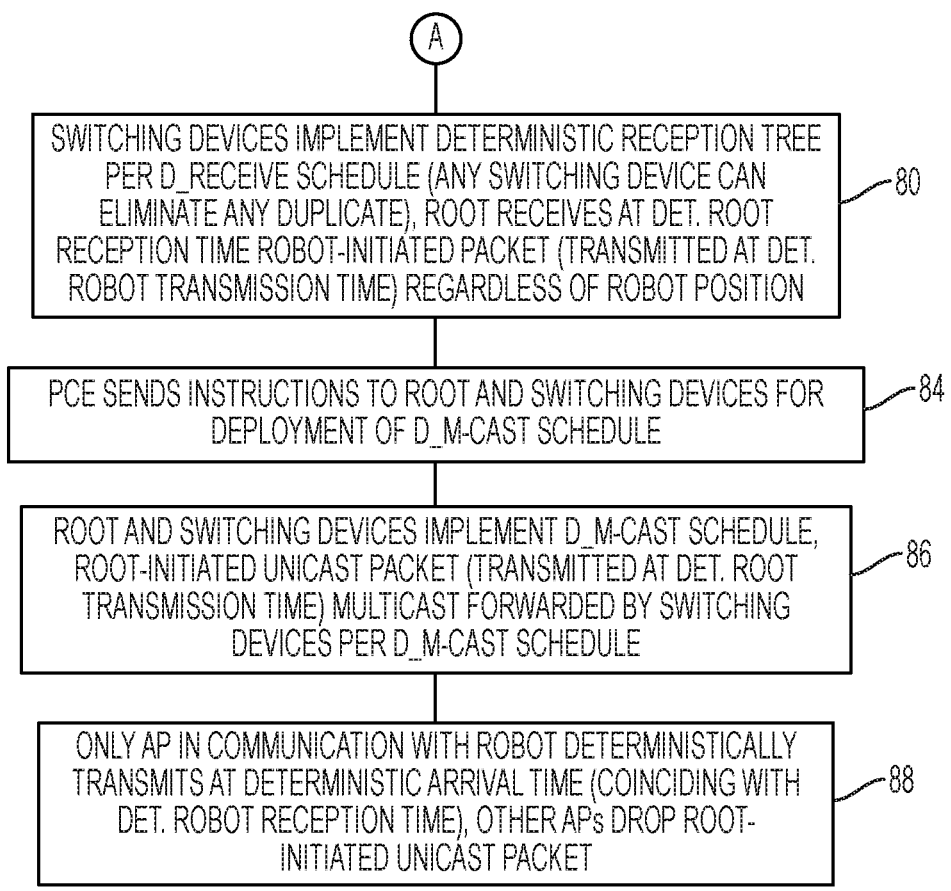

Referring to FIG. 3B, each of the switching devices 18*a*-18*m* in operation 80 receives a corresponding set of instructions for implementing the deterministic reception tree 26, relative to a prescribed deterministic robot transmission time 32 (t=0 in FIG. 4C). Deployment of the deterministic reception tree 26 by the switching devices 18*a*-18*m* in the deterministic data network 10 enables the root network device 28 to deterministically receive a robot-initiated data packet 30, transmitted by the mobile network device 14 and received by one or more of the wireless access point devices 16 at the deterministic robot transmission time 32 (t=0 in FIG. 4C), via the deterministic reception tree 26 at the deterministic root reception time 38 (t=6 of FIG. 4C), regardless of the distance between the receiving wireless access point device 16 and the root network device 28.

As illustrated in FIG. 4C, each of the switching devices 18*a*, 18*b*, 18*d*, 18*e*, and/or 18*f* can be configured by the respective instructions from the PCE 12 to respond to an associated wireless access point device 16 detecting the robot-initiated data packet 30 (at the deterministic robot transmission time 32 (t=0)) by deterministically forwarding the received robot-initiated data packet 30 at the deterministic reception forwarding time 34*a* (t=1) along the deterministic reception tree 26 to the next-hop switching device (18*j*, 18*c*, 18*h*, 18*m*, and/or 18*g*, respectively) for storage in its corresponding transmit buffer 48; each of the switching devices 18*c*, 18*g*, and/or 18*m* can be configured by the respective instructions from the PCE 12 to deterministically forward the received robot-initiated data packet 30 (from a child switching device 18 and/or an associated wireless access point device 16) at the deterministic reception forwarding time 34*b* (t=2) along the deterministic reception tree 26 to the next-hop switching device (18*i*, 18*l*, and/or 18*h*, respectively) for storage in its corresponding transmit buffer 48; each of the switching devices 18*h* and/or 18*l* can be configured by the respective instructions from the PCE 12 to deterministically forward the received robot-initiated data packet 30 (from a child switching device 18 and/or an associated wireless access point device 16) at the deterministic reception forwarding time 34*c* (t=3) along the deterministic reception tree 26 to the next-hop switching device 18*i* for storage in its corresponding transmit buffer 48 (as described below with respect to operation 80, the switching device 18*i* can eliminate any duplicates of the robot-initiated data packet); the switching device 18*i* can be configured by the corresponding instructions from the PCE 12 to deterministically forward the received robot-initiated data packet 30 (received from its associated wireless access point device 16*i* or any one of the switching devices 18*c*, 18*h*, and/or 18*l*) at the deterministic reception forwarding time 34*d* (t=4) along the deterministic reception tree 26 to the next-hop switching device 18*j* for storage in the transmit buffer 48 of the switching device 18*j*; the switching device 18*j* can be configured by the corresponding instructions from the PCE 12 to deterministically forward the received robot-initiated data packet 30 (received from any one of the switching devices 18*a*, 18*i*, and/or its associated wireless access point device 16*j*) at the deterministic reception forwarding time 34*e* (t=5) to the next-hop switching device 18*k* along the deterministic reception tree 26 for storage in the transmit buffer 48 of the switching device 18*k*; and the switching device 18*k* can be configured by the corresponding instructions from the PCE 12 to deterministically forward the robot-initiated data packet 30 to the root network device 28 at the deterministic root reception time 38 (t=6).

In one embodiment, the wireless access point devices 16 and the mobile network device 14 can implement the wireless data links 20 as Wi-Fi links, such that the mobile network device 14 establishes its Wi-Fi link with one and only one wireless access point device 16 at a time, hence there is no concern of any collision of the same robot-initiated data packet 30 from different wireless access point devices 16 as the robot-initiated data packet 30 travels "up" the deterministic reception tree 26 toward the root network device 28.

Alternatively, the switching devices 18*a* through 18*m* in operation 80 can implement instructions (received from the PCE 12) to execute elimination of any duplicate of the robot-initiated data packet 30, for example if the same robot-initiated data packet 30 is received by neighboring wireless access point devices 16 (e.g., 16*a* and 16*b*) deploying a wireless technology (e.g., 5G with collaboration, LoRa, etc.) that allows more than one wireless access point device 16 to receive the robot-initiated data packet 30: for example if both wireless access point devices 16*a* and 16*b* receive the same robot-initiated data packet 30, the switching device 18*j* can eliminate the duplicate robot-initiated data packet 30 received from the switching device 18*i* at the deterministic reception forwarding time 34*d*, ensuring only a single copy of the data packet 30 is sent via the deterministic reception tree 26 to the root network device 28 at the prescribed reception time deterministic root reception time 38 (t=6).

Hence, the mobile network device 14 can deterministically transmit its robot-initiated data packet 30 at the deterministic robot transmission time 32 from any physical location (e.g., 82*a* of FIG. 1, 82*b* of FIG. 4B, or 82*c* of FIG. 4C), and the deterministic reception tree 26 can guarantee that the robot-initiated data packet 30 can be deterministically received by the root network device 28 at the deterministic root reception time 38 (t=6).

The processor circuit 42 of the PCE 12 in operation 84 also can send instructions to the root network device 28 and the switching devices 18*a* through 18*m* for deployment of the deterministic multicast schedule 66 illustrated in FIG. 4B, enabling the root network device 28 to deterministically transmit a root-originated message 68 at a deterministic root transmission time 70 for reception by the mobile network device 14 at its corresponding deterministic robot reception time 72, regardless of the physical location 82 of the mobile network device 14 within the wireless coverage area 22.

Hence, the mobile network device 14, the wireless coverage area 22, and the switching devices 18a through 18m in operation 86 can implement the deterministic multicast schedule 66 that enables a root-initiated unicast packet 68 to be replicated by the minimum spanning tree 60 for deterministic multicast forwarding via the minimum spanning tree 60 and deterministic delivery in operation 88 to all possible locations of the mobile network device 14 at the deterministic robot reception time 72, enabling deterministic delivery of the root-initiated unicast packet 68 regardless of the physical location 82 of the mobile network device 14 within the wireless coverage area 22.

In certain embodiments the mobile network device 14 and the wireless access point devices 16 may implement a wireless network protocol (e.g. Wi-Fi) that requires that the mobile network device 14 is in communication with only one wireless access point device 16 at a time, such that in operation 88 only the one wireless access point device 16 that detects it is in communication with the mobile network device 14 (e.g., 16e of FIG. 4B) can deterministically transmit the root-originated message 68 at the wireless access point device 16e to the mobile network device 14, and all other wireless access point devices 16 would drop the root-initiated unicast packet 68.

Hence, the example embodiments enable two-way deterministic communications between the mobile network device 14 and the root network device 28, regardless of the physical location 82 of the mobile network device 14 as it moves unpredictably within the wireless coverage area 22 of the deterministic data network 10. Since the processor circuit 42 of the PCE 12 can generate and deploy the deterministic reception tree 26 substantially faster than any movement by the mobile network device 14, the PCE 12 can update or change the deterministic reception tree 26 and/or the deterministic multicast schedule 66, as needed, without any disruption in the deterministic data flows between the mobile network device 14 and the destination root network device 28.

Figure 3C:
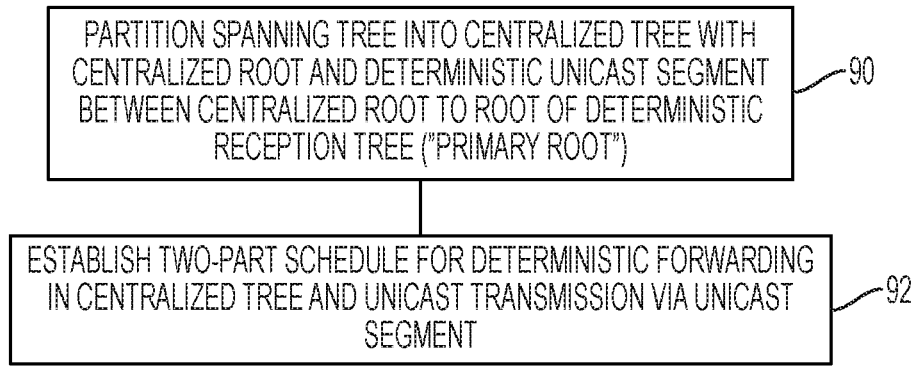

FIG. 3C illustrates example optimizations of the deterministic reception tree 26. As illustrated in FIG. 4C, the switching device 18j can be required to store in its transmit buffer 48 a received robot-initiated data packet 30 for at least five (5) time intervals, i.e., from deterministic robot transmission time 32 (t=0) to transmission to the switching device 18k at the deterministic reception forwarding time 34e (t=5): if such buffering causes excessive storage requirements on the transmit buffer 48 of the switching device 18j, the processor circuit 42 of the PCE 12 in operation 90 can partition the minimum spanning tree 60 of FIG. 4A into a centralized tree with a centralized root (e.g., the switching device 18i becomes the centralized root and the switching device 18j becomes a child that forwards a robot-initiated data packet 30 at the deterministic reception forwarding time 34b (t=2) to the centralized root 18i), where the centralized root accepts only a single copy of the robot-initiated data packet 30 from the centralized tree during a first part of a two-part schedule; the PCE 12 also creates a deterministic unicast segment (e.g., 18i-18j-18k—root) that enables the centralized root 18i to reach the root network device 28. The PCE 12 also establishes in operation 92 a schedule for the unicast segment (e.g., 18i to 18j at t=4; 18j to 18k at t=5; 18k to root at t=6). Hence, the centralized root 18i in operation 92 deterministically receives the robot-initiated data packet 30 by the deterministic reception forwarding time 34c (t=3) during the centralized root forwarding schedule, and the centralized root 18i forwards the robot-initiated data packet 30 root network device 28 via the unicast segment that utilizes the deterministic reception forwarding times 34d, 34e, and 34f at t=4, t=5, and t=6, respectively.

Figure 3D:
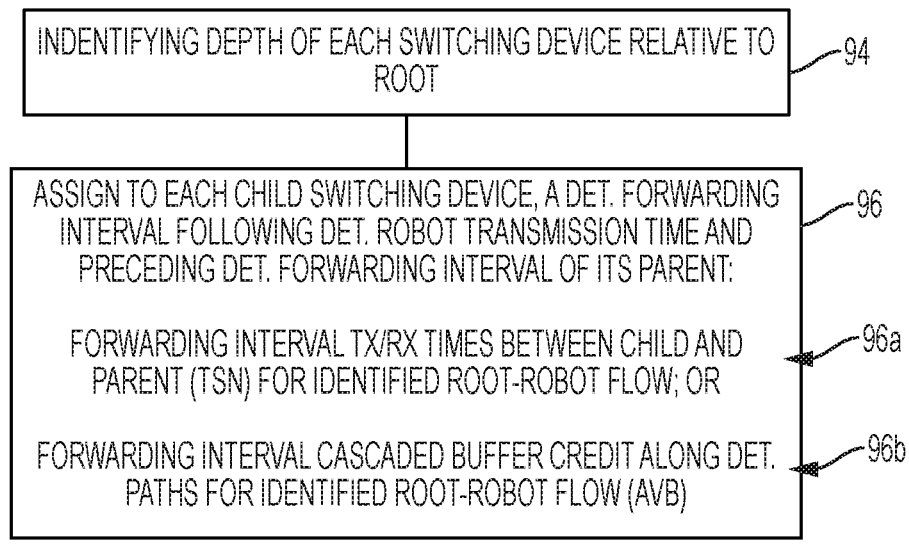

FIG. 3D illustrates various techniques for establishing the deterministic schedules for the deterministic reception tree 26 that include the deterministic reception forwarding times 34, and/or the deterministic multicast schedule 66 that includes the deterministic multicast forwarding times 74. The processor circuit 42 of the PCE 12 in operation 94 can identify the depth (e.g., hop count) of each switching device 18 relative to the root network device 28, and assign to each child switching device 18 a deterministic forwarding interval that follows the deterministic robot transmission time 32 and that precedes the deterministic reception forwarding time 34 of its parent; for example, the processor circuit 42 of the PCE 12 can determine from the parent-child relationships stored in the data structure 62 that the deterministic forwarding interval for of the children 18c, 18h, and 18l should precede the corresponding deterministic forwarding interval 34d of the corresponding parent 18i.

The processor circuit 42 of the PCE 12 in operation 96a can deploy the deterministic transmission times 32, 34, 38 (FIG. 4C) and/or 70, 72, 74 (FIG. 4B) (also referred to as forwarding intervals) as deterministic transmit/receive intervals between child and parent devices (i.e., the transmit interval for the transmitting device coincides with the receive interval of the receiving device), for example according to a time sensitive networking (TSN) based deployment for the identified flows between the root network device 28 and the mobile network device 14. In particular, use of IEEE P802.1Qbt to deploy TSN involves use of a "plus or minus" guard time that enables any precisely-defined transmission time to be allocated as a time interval that can be assigned to one of the transmission, forwarding, or reception times deterministic times 32, 34, 38 (FIG. 4C) and/or 70, 72, 74 (FIG. 4B) described herein.

Alternately the processor circuit 42 of the PCE 12 in operation 96b can deploy the deterministic times 32, 34, 38 (FIG. 4C) and/or 70, 72, 74 (FIG. 4B) as cascaded buffer credits along the deterministic paths in the minimum spanning tree 60 for example according to an audio/video bridging (AVB) based deployment for the identified flows between the root network device 28 and the mobile network device 14; in this example, the PCE 12 can periodically supply buffer credits to the transmit buffers 48 of each of the switching devices 18 in the deterministic reception tree 26 and/or the deterministic multicast schedule 66 (all the credits along the converging paths are credited for the robot-initiated data packet 30, but since only one converging path is used, the other unused credits by the other switching devices 18 can be discarded at the end of the allocated deterministic reception forwarding time 34. Hence, the example embodiment can be deployed in wired deterministic networks utilizing either TSN and/or AVB deployments.

Additional embodiments enable the scheduling of network devices to be executed based on the controller (e.g., a Path Computation Element (PCE)) 12 generating the deterministic reception tree 26 and/or the deterministic multicast schedule 66 based on the relative buffer capacity of the forwarding network devices. In one example, the PCE 12 can generate a deterministic reception tree 26 and/or a deterministic multicast schedule 66 that specifies a "downstream" buffering for execution by the forwarding network devices, where the "downstream" buffering maximizes buffering of the message in penultimate nodes having next-hop connections with the relevant destination device (e.g., the root network device 28 for the deterministic reception tree 26 or the mobile network device 14 for the deterministic multicast schedule 66): the "downstream" buffering enables each penultimate node to store the message as long as necessary until the prescribed arrival time.

In another example, the PCE 12 can generate a deterministic reception tree 26 and/or a deterministic multicast schedule 66 that specifies an "upstream" buffering for execution by the forwarding network devices, where the "upstream" buffering minimizes buffering of the message in the penultimate nodes and maximizes buffering of the message in network devices closest to the source of the data packet: the "upstream" buffering enables the delay of transmission through the deterministic reception tree 26 and/or a deterministic multicast schedule 66 as long as possible. As apparent from the foregoing, the PCE can establish the deterministic multicast schedule 66 based on recursive analysis of the traffic rate of each of the switching devices 18 relative to the buffer fill rate and buffer empty rate of the associated transmit buffers 48. The PCE 12 can modify the minimum spanning tree 60, as needed, in order to accommodate the buffering requirements of the transmit buffer 48 in each switching device 18 for different identified traffic flows.

According to example embodiments, deterministic data collection from a mobile network device to a root destination device can be established using a deterministic reception tree that enables reception of a data packet from any one of multiple physical locations, where the received data packet deterministically converges to the destination root. Hence, deterministic data collection can be established without constructing a deterministic hop-by-hop sequence of nodes. As apparent from the foregoing, the example embodiments can establish deterministic data collection for multiple mobile network device—root device pairs, each device pair having a corresponding deterministic multicast schedule for root-initiated data and a corresponding deterministic reception tree for mobile network device-initiated data.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   determining, by an apparatus, access point devices providing network coverage for a mobile network device within a prescribed coverage area of a deterministic network;
   establishing, by the apparatus, a deterministic reception tree comprising a root network device and switching devices, each of the access point devices coupled to the deterministic reception tree via at least one of the switching devices, the deterministic reception tree enabling any one or more of the switching devices to forward toward the root network device a data packet, transmitted by the mobile network device at a prescribed transmission time, for deterministic reception by the root network device at a prescribed reception time regardless of a distance of any of the access point devices from the root network device; and
   causing, by the apparatus, the switching devices to implement the deterministic reception tree enabling the root network device to deterministically receive the data packet, received by any one or more of the access point devices, at the prescribed reception time, wherein:
   the establishing of the deterministic reception tree comprises creating a deterministic reception schedule for the switching devices, the deterministic reception schedule causing the switching devices to forward the data packet for delivery to the root network device at the prescribed reception time; and
   the creation of the deterministic reception tree further comprises causing any switching device to execute elimination of any duplicate of the data packet, the elimination ensuring only a single copy of the data packet is sent via the deterministic reception tree to the root network device at the prescribed reception time.

2. The method of claim 1, wherein the creation of the deterministic reception schedule further comprises:
   first generating a minimum spanning tree from the root network device to the access point devices via the switching devices;
   second generating a deterministic multicast schedule that enables the root network device to transmit, via the minimum spanning tree, a multicast message that enables the switching devices to deliver the multicast message to each of the access point devices simultaneously at a same arrival time, regardless of the distance of any of the access point devices to the root network device; and
   reversing the deterministic multicast schedule for generation of the deterministic reception schedule via the minimum spanning tree.

3. The method of claim 2, further comprising:
   causing deterministic transmission of a unicast packet from the root network device via the deterministic multicast schedule and simultaneously received by the access point devices;
   wherein only one of the access point devices in communication with the mobile network device deterministically transmits the unicast packet to the mobile network device.

4. The method of claim 1, wherein the creation of the deterministic reception tree further comprises:
   identifying one of the switching devices as a centralized root network device of a centralized tree for receiving a single copy of the data packet; and
   establishing within the deterministic reception tree a deterministic unicast segment from the centralized root network device to the root network device, wherein the centralized reception tree is different from the deterministic reception tree and the centralized root network device is different from the root network device.

5. The method of claim 1, wherein the creating of the deterministic reception schedule comprises:
   identifying each switching device as having a corresponding identified depth relative to the root network device;
   assigning, to each child switching device in the deterministic reception tree, a corresponding deterministic forwarding interval following the prescribed transmission time and preceding a corresponding deterministic forwarding interval of its corresponding parent switching device.

6. The method of claim 5, wherein the deterministic forwarding interval comprises one of:
   a prescribed transmission time of said each switching device coinciding with a corresponding reception time assigned to the corresponding parent device; or
   a prescribed buffer credit that causes said each switching device to transmit the data packet at a corresponding transmission time before the corresponding transmission time assigned to the corresponding parent device.

7. The method of claim 1, wherein:
each of the access point devices provide wireless network coverage for the mobile network device and includes a wired connection to a corresponding switching device;
each switching device having a wired link for forwarding the data packet toward the root network device via the deterministic reception tree according to a deterministic schedule.

8. An apparatus comprising:
a processor circuit configured for determining access point devices providing network coverage for a mobile network device within a prescribed coverage area of a deterministic network;
the processor circuit further configured for establishing a deterministic reception tree comprising a root network device and switching devices, each of the access point devices coupled to the deterministic reception tree via at least one of the switching devices, the deterministic reception tree enabling any one or more of the switching devices to forward toward the root network device a data packet, transmitted by the mobile network device at a prescribed transmission time, for deterministic reception by the root network device at a prescribed reception time regardless of a distance of any of the access point devices from the root network device; and
a device interface circuit configured for causing the switching devices to implement the deterministic reception tree enabling the root network device to deterministically receive the data packet, received by any one or more of the access point devices, at the prescribed reception time, wherein:
the processor circuit is configured for establishing the deterministic reception tree based on creating a deterministic reception schedule for the switching devices, the deterministic reception schedule causing the switching devices to forward the data packet for delivery to the root network device at the prescribed reception time;
the processor circuit further is configured for causing any switching device to execute elimination of any duplicate of the data packet in the deterministic reception tree, the elimination ensuring only a single copy of the data packet is sent via the deterministic reception tree to the root network device at the prescribed reception time.

9. The apparatus of claim 8, wherein the processor circuit is configured for creating the deterministic reception schedule based on:
first generating a minimum spanning tree from the root network device to the access point devices via the switching devices;
second generating a deterministic multicast schedule that enables the root network device to transmit, via the minimum spanning tree, a multicast message that enables the switching devices to deliver the multicast message to each of the access point devices simultaneously at a same arrival time, regardless of the distance of any of the access point devices to the root network device; and
reversing the deterministic multicast schedule for generation of the deterministic reception schedule via the minimum spanning tree.

10. The apparatus of claim 9, wherein:
the processor circuit further is configured for causing deterministic transmission of a unicast packet from the root network device via the deterministic multicast schedule and simultaneously received by the access point devices;
wherein only one of the access point devices in communication with the mobile network device deterministically transmits the unicast packet to the mobile network device.

11. The apparatus of claim 8, wherein the processor circuit further is configured for creating the deterministic reception tree based on:
identifying one of the switching devices as a centralized root network device of a centralized tree for receiving a single copy of the data packet; and
establishing within the deterministic reception tree a deterministic unicast segment from the centralized root network device to the root network device, wherein the centralized reception tree is different from the deterministic reception tree and the centralized root network device is different from the root network device.

12. The apparatus of claim 8, wherein the processor circuit is configured for creating the deterministic reception schedule based on:
identifying each switching device as having a corresponding identified depth relative to the root network device; and
assigning, to each child switching device in the deterministic reception tree, a corresponding deterministic forwarding interval following the prescribed transmission time and preceding a corresponding deterministic forwarding interval of its corresponding parent switching device.

13. The apparatus of claim 12, wherein the deterministic forwarding interval comprises one of:
a prescribed transmission time of said each switching device coinciding with a corresponding reception time assigned to the corresponding parent device; or
a prescribed buffer credit that causes said each switching device to transmit the data packet at a corresponding transmission time before the corresponding transmission time assigned to the corresponding parent device.

14. The apparatus of claim 8, wherein:
each of the access point devices provide wireless network coverage for the mobile network device and includes a wired connection to a corresponding switching device;
each switching device having a wired link for forwarding the data packet toward the root network device via the deterministic reception tree according to a deterministic schedule.

15. One or more non-transitory tangible media encoded with logic for execution by a machine and when executed by the machine operable for:
determining access point devices providing network coverage for a mobile network device within a prescribed coverage area of a deterministic network;
establishing a deterministic reception tree comprising a root network device and switching devices, each of the access point devices coupled to the deterministic reception tree via at least one of the switching devices, the deterministic reception tree enabling any one or more of the switching devices to forward toward the root network device a data packet, transmitted by the mobile network device at a prescribed transmission time, for deterministic reception by the root network device at a prescribed reception time regardless of a distance of any of the access point devices from the root network device; and causing the switching devices to implement the deterministic reception tree enabling the root network device to deterministically receive the data packet, received by any one or more of the access point devices, at the prescribed reception time, wherein:

the establishing of the deterministic reception tree comprises creating a deterministic reception schedule for the switching devices, the deterministic reception schedule causing the switching devices to forward the data packet for delivery to the root network device at the prescribed reception time; and the creation of the deterministic reception tree further comprises causing any switching device to execute elimination of any duplicate of the data packet, the elimination ensuring only a single copy of the data packet is sent via the deterministic reception tree to the root network device at the prescribed reception time.

16. The one or more non-transitory tangible media of claim 15, wherein:

the creation of the deterministic reception schedule further comprises:

first generating a minimum spanning tree from the root network device to the access point devices via the switching devices, second generating a deterministic multicast schedule that enables the root network device to transmit, via the minimum spanning tree, a multicast message that enables the switching devices to deliver the multicast message to each of the access point devices simultaneously at a same arrival time, regardless of the distance of any of the access point devices to the root network device, and reversing the deterministic multicast schedule for generation of the deterministic reception schedule via the minimum spanning tree.

17. The one or more non-transitory tangible media of claim 16, further operable for:

causing deterministic transmission of a unicast packet from the root network device via the deterministic multicast schedule and simultaneously received by the access point devices;

wherein only one of the access point devices in communication with the mobile network device deterministically transmits the unicast packet to the mobile network device.

18. The one or more non-transitory tangible media of claim 15, wherein the creation of the deterministic reception tree further comprises:

identifying one of the switching devices as a centralized root network device of a centralized tree for receiving a single copy of the data packet; and establishing within the deterministic reception tree a deterministic unicast segment from the centralized root network device to the root network device, wherein the centralized reception tree is different from the deterministic reception tree and the centralized root network device is different from the root network device.

19. The one or more non-transitory tangible media of claim 15, wherein the creating of the deterministic reception schedule comprises:

identifying each switching device as having a corresponding identified depth relative to the root network device;

assigning, to each child switching device in the deterministic reception tree, a corresponding deterministic forwarding interval following the prescribed transmission time and preceding a corresponding deterministic forwarding interval of its corresponding parent switching device.

20. The one or more non-transitory tangible media of claim 19, wherein the deterministic forwarding interval comprises one of:

a prescribed transmission time of said each switching device coinciding with a corresponding reception time assigned to the corresponding parent device; or a prescribed buffer credit that causes said each switching device to transmit the data packet at a corresponding transmission time before the corresponding transmission time assigned to the corresponding parent device.

* * * * *